(12) United States Patent
Wang (10) Patent No.: US 11,361,881 B2
(45) Date of Patent: Jun. 14, 2022

(54) IRREGULAR-SHAPED CABLE AND METHOD FOR MANUFACTURING THE CABLE

(71) Applicant: JILIN ZHONG YING HIGH TECHNOLOGY CO., LTD., Changchun (CN)

(72) Inventor: Chao Wang, Changchun (CN)

(73) Assignee: JILIN ZHONG YING HIGH TECHNOLOGY CO., LTD., Changchun (CN)

( * ) Notice: Subject to any disclaimer, the term of this patent is extended or adjusted under 35 U.S.C. 154(b) by 0 days.

(21) Appl. No.: 16/462,246

(22) PCT Filed: Oct. 25, 2017

(86) PCT No.: PCT/CN2017/107577
§ 371 (c)(1),
(2) Date: May 20, 2019

(87) PCT Pub. No.: WO2018/095177
PCT Pub. Date: May 31, 2018

(65) Prior Publication Data
US 2019/0333657 A1 Oct. 31, 2019

(30) Foreign Application Priority Data

Nov. 22, 2016 (CN) .......................... 201611046351.1

(51) Int. Cl.
*H01B 7/04* (2006.01)
*H01B 7/24* (2006.01)
(Continued)

(52) U.S. Cl.
CPC .................. *H01B 7/04* (2013.01); *H01B 7/24* (2013.01); *H01B 13/012* (2013.01); *H01B 13/06* (2013.01)

(58) Field of Classification Search
CPC ............................. H01R 12/63; B60R 16/0215
See application file for complete search history.

(56) References Cited

U.S. PATENT DOCUMENTS 2,131,766 A * 10/1938 Temple, Jr. ............. B21F 15/06
29/421.2
3,322,888 A * 5/1967 Zemels .................. H01R 4/186
D13/149
(Continued)

FOREIGN PATENT DOCUMENTS

CN 2388691 Y 7/2000
CN 203276929 U 11/2013
(Continued)

*Primary Examiner* — William H. Mayo, III
*Assistant Examiner* — Krystal Robinson
(74) *Attorney, Agent, or Firm* — Bayramoglu Law Offices LLC (57) ABSTRACT

An irregular-shaped cable and a method for manufacturing the cable. The irregular-shaped cable includes a conductive core formed by at least two conductive core segments having different cross-sectional shapes which are connected end to end. An insulation layer is wrapped over the conductive core segment from the outside, and the profile of the insulation layer fits with the conductive core segments. The cable can be fitted with the vehicle body. The manufacturing method includes a manufacture of the conductive core segments, a connection of the conductive core segments, and a manufacture of the insulation layer.

19 Claims, 4 Drawing Sheets

(51) Int. Cl.
  *H01B 13/012* (2006.01)
  *H01B 13/06* (2006.01)

(56) References Cited

U.S. PATENT DOCUMENTS

| | | | | |
|---|---|---|---|---|
| 3,402,416 A * | 9/1968 | Shaw | ............ | D01D 5/20 15/207.2 |
| 3,532,083 A * | 10/1970 | Lucht | ............ | B23D 61/185 125/21 |
| 3,737,990 A * | 6/1973 | Schut | ............ | B21J 15/24 29/605 |
| 4,077,695 A * | 3/1978 | Bakermans | ............ | H01R 43/01 29/760 |
| 4,566,745 A * | 1/1986 | Maros | ............ | H01R 13/6592 439/98 |
| 6,162,540 A * | 12/2000 | Tsuji | ............ | H01B 3/443 174/110 V |
| 6,180,232 B1 * | 1/2001 | McCullough | ............ | H01B 1/023 428/375 |
| 6,555,048 B1 * | 4/2003 | Yoon | ............ | C04B 35/14 65/395 |
| 9,263,165 B2 * | 2/2016 | Yoshinaga | ............ | H02G 15/02 |
| 10,355,372 B2 * | 7/2019 | Iizuka | ............ | H01B 1/22 |
| 2004/0052596 A1 * | 3/2004 | Kleine | ............ | B25D 17/088 408/226 |
| 2005/0016755 A1 * | 1/2005 | Martinez | ............ | H01B 11/1839 174/121 A |
| 2005/0121222 A1 * | 6/2005 | Lee | ............ | H01B 11/12 174/113 R |
| 2007/0205675 A1 * | 9/2007 | Petro | ............ | H02K 1/08 310/44 |
| 2009/0014199 A1 * | 1/2009 | Chiruvella | ............ | C08L 71/12 174/11 OF |
| 2009/0266575 A1 * | 10/2009 | Yoshimoto | ............ | H01B 7/0009 174/128.1 |
| 2010/0101858 A1 * | 4/2010 | Kato | ............ | H01R 4/04 174/84 R |
| 2011/0057537 A1 * | 3/2011 | Matsushita | ............ | H02K 3/18 310/208 |
| 2011/0062408 A1 * | 3/2011 | Kozicki | ............ | G11C 14/00 438/584 |
| 2011/0097048 A1 * | 4/2011 | Olsen | ............ | C03B 37/02709 385/124 |
| 2012/0093468 A1 * | 4/2012 | Keller | ............ | G02B 6/4411 385/106 |
| 2012/0112527 A1 * | 5/2012 | Kroulik | ............ | B60L 50/64 174/133 R |
| 2012/0261158 A1 * | 10/2012 | Daniel | ............ | H01B 1/04 174/102 R |
| 2013/0105218 A1 * | 5/2013 | Kuboshima | ............ | H01B 7/00 174/72 A |
| 2013/0140055 A1 * | 6/2013 | Adachi | ............ | B60R 16/0215 174/113 R |
| 2013/0231011 A1 * | 9/2013 | Sytsma | ............ | H01R 13/65914 439/723 |
| 2013/0292156 A1 * | 11/2013 | Okada | ............ | B21C 37/04 72/379.2 |
| 2014/0202731 A1 * | 7/2014 | Goto | ............ | H01B 7/08 174/11 OR |
| 2015/0310960 A1 * | 10/2015 | Leach | ............ | H02K 3/28 310/179 |
| 2016/0071630 A1 * | 3/2016 | Sugino | ............ | H02G 15/1806 174/68.3 |
| 2016/0141080 A1 * | 5/2016 | Otto | ............ | H01L 39/143 174/125.1 |
| 2016/0152197 A1 * | 6/2016 | Kugimiya | ............ | H02G 3/0406 174/72 A |
| 2017/0085243 A1 * | 3/2017 | Lee | ............ | H01P 5/028 |
| 2018/0134238 A1 * | 5/2018 | Araki | ............ | H02G 3/0462 |
| 2018/0243052 A1 * | 8/2018 | Lee | ............ | A61C 7/12 |
| 2019/0118739 A1 * | 4/2019 | Takamatsu | ............ | B60R 16/0239 |
| 2020/0189156 A1 * | 6/2020 | Ma | ............ | H01B 13/00 |

FOREIGN PATENT DOCUMENTS

| | | | | |
|---|---|---|---|---|
| CN | 104112508 A | | 10/2014 | |
| CN | 203910297 U | | 10/2014 | |
| CN | 104384219 A | | 3/2015 | |
| CN | 104599774 A | | 5/2015 | |
| CN | 104993443 A | | 10/2015 | |
| CN | 204696246 U | | 10/2015 | |
| CN | 105280313 A | | 1/2016 | |
| CN | 106062889 A | | 10/2016 | |
| CN | 106653163 A | | 5/2017 | |
| CN | 206194396 U | | 5/2017 | |
| DE | 102009032987 A1 * | | 1/2011 | ......... B60R 16/0207 |
| DE | 102009032987 A1 | | 1/2011 | |
| DE | 202015103854 U1 | | 8/2015 | |
| DE | 102016002977 A1 | | 9/2016 | |
| EP | 1701362 A2 | | 9/2006 | |
| JP | 2013020833 A | | 1/2013 | |

\* cited by examiner

IRREGULAR-SHAPED CABLE AND METHOD FOR MANUFACTURING THE CABLE

CROSS REFERENCE TO RELATED APPLICATIONS

This application is the national phase entry of International Application PCT/CN2017/107577, filed on Oct. 25, 2017 which is based upon and claims priority to Chinese Patent Application No. 201611046351.1, filed on Nov. 22, 2016, the entire contents of which are incorporated herein by reference.

TECHNICAL FIELD

The present invention relates to a cable, and in particular, to an irregular-shaped cable and a method for manufacturing the cable. The irregular-shaped cable is used in an automotive vehicle and adaptable to the inner profile of the automotive vehicle.

BACKGROUND

The existing cable for automotive vehicles generally consists of a conductive core and an insulation layer wrapped over the conductive core. Usually, the currently used cables for automotive vehicles are round cables while some improved cables have a flat shape. Owing to the round cross section of the round cables, the forces applied to different points of the same circumference are isotropous. As a result, it is hard to bend a cable harness because of a deformation difficulty under an action of an external force.

To this end, Chinese Utility Patent Application No. 104112508 A discloses a novel flat-shaped cable used inside electrical vehicles. With the flat-shape design, its bending radius in the direction perpendicular to the width direction of solid conductive core is 3 times the thickness of the finished product, and its flexibility is better than that of the round soft solid cable with the same cross section area. The solid conductive core is stacked with multiple flat rectangular copper strips without any adhesive to bond the strips together, so as to ensure the flexibility. However, since the internal profile of the automotive vehicle varies, the single use of the standard flat cables will cause a great wiring consumption increase, thereby increasing the cost of wiring. In the meantime, there is a high tendency for stress on one cable due to the use of a single type of flat cable, resulting in a failure to release stress remarkably when a car crash happens, which will cause breakage of cables and severe accidents.

In addition, Chinese Utility Patent CN 2388691Y discloses a cable with a hollow square or hollow rectangular cross section and so on. Under the same current capacity, such a design can reduce the cross-sectional area and weight, and thus save the production cost of cables. However, the cables having a single shape are unable to perfectly match the internal profile of the automotive vehicle, since the cable is unable to connect cables of different shapes to fit in with the actual demand of wiring in the complicated profile of a car body.

Besides, Chinese Patent Application CN 104384219 A discloses an extrusion method of an aluminum alloy lamp holder core bar including preparing a preform body for extrusion; performing a bench-work; heating the preform body; putting the heated preform body in a concave die of the composite extruding mold, then performing molding and extruding, taking out the component, cooling down, and grinding. However, the obtained product has a single shape, which cannot satisfy the requirement of connecting product segments of different shapes.

SUMMARY

To overcome the drawbacks of the prior art, it is therefore an objective of the present invention to provide an irregular-shaped cable and a method for manufacturing the cable which not only can improve the security capabilities of an automotive vehicle, but also can reduce the production cost and meet people's demands for lighter vehicles.

To solve the above problems, the present invention uses the following technical solutions.

An irregular-shaped cable has its conductive core formed by at least two conductive core segments with different cross-sectional shapes connected end to end.

It should be noted that the phrase "irregular shape" in the present invention means that the conductive core is formed by at least two conductive core segments with different cross-sectional shapes connected end to end. With this configuration, the circumstance where stresses are applied on one cable in ordinary cables can be avoided, so the stress on the cables can be released rapidly, thereby preventing cables from breakage due to stresses and greatly improving the security capabilities of the automotive vehicles.

Preferably, the effective cross-sectional area for an electric conduction of each conductive core segment has a tolerance range of ±20%.

It should be noted that the effective cross-sectional area for the electric conduction inside each conductive core segment may have a certain tolerance due to the manufacture errors or adaption to different vehicles in practice. The inventor believes that the tolerance should be within ±20% to ensure the electrical safety. The tolerance should be considered in terms of the effective cross-sectional area for electric conduction of each conductive core segment, rather than different conductive core segments. It is concluded by the inventor from multiple experiments and creative improvements that the external insulation layer of the cable segment with the effective cross-sectional area for electric conduction will not be melted when the tolerance range is set as ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%. While, the external insulation layer of the cable segment with the effective cross-sectional area for electric conduction exceeding the tolerance limit begins to melt when the tolerance range is set beyond ±20%, which thus causes damage to the electric security of the whole irregular-shaped cable. Therefore, the inventor believes that the cases where the insulation layer of a part of the irregular cable is melted due to high temperature can be effectively reduced by setting a tolerance range of the effective cross-sectional area for electric conduction as ±20%. By doing so, the electric security of the irregular cable can be ensured.

It should be noted that, the conductive core segments may be solid, partly solid, or all hollow.

Further, the conductive core segments may be flexible.

The adjacent conductive core segments that are connected to each other may be a combination of a solid conductive core segment and a hollow conductive core segment, a solid conductive core segment and a flexible conductive core segment, a solid conductive core segment and another solid conductive core segment, a hollow conductive core segment and a flexible conductive core segment, a hollow conductive core segment and another hollow conductive core segment, or a flexible conductive core segment and another flexible conductive core segment. Certainly, any combination of the aforementioned plurality of types of conductive core segments should also be included in the technical solutions of the present invention.

Preferably, an end of one conductive core segment is connected to an end of another adjacent conductive core segment.

Preferably, an upper surface of an end of one conductive core segment is connected to a lower surface of an end of another adjacent conductive core segment.

It should be noted that, a method for connecting the conductive core segments may be welding, crimping, butt fusion, or plug-in.

Preferably, if two adjacent conductive core segments have different cross-sectional shapes, a conductive core connector is used to connect the two adjacent conductive core segments. The shapes of the two ends of the conductive core connector are the same as the cross sectional shapes of the two adjacent conductive core segments, respectively.

It should be noted that, the use of the conductive core connector which has shapes at two ends respectively the same as the cross sectional shapes of the two adjacent conductive core segments can solve the problem that two cable segments with different cross-sectional shapes cannot be directly connected to each other.

Preferably, the values of the cross sectional areas of the conductive core connector are close to each other.

It should be noted that, with the values of the cross sectional areas of the conductive core connector close to each other, a better consistency of the conduction effects can be achieved. As a preferred embodiment, the values of the cross sectional areas of the conductive core connector are equal at every position. In this case, the best consistency of the conduction effects of the conductive core connector can be achieved.

Preferably, the irregular-shaped cables are connected according to the body profile of an automotive vehicle. According to this solution, the cables can be installed according to the actual need of the body profiles of different parts of the vehicle, thereby saving material, space, and cost of the automotive vehicle.

Preferably, the irregular-shaped cable extends in superposing, folding and turning manner.

By extending the cable in a superposing, folding and turning manner, the eddy current effect caused by the high-voltage current transmission can be eliminated without affecting the operation of other electrical devices in the vehicle, so the cables are more suitable for high-voltage large-current applications.

Preferably, the conductive core segments are made of aluminum or aluminum alloy.

It should be noted that, the copper conductive core generally used in the prior art is substituted with the aluminum conductive core (including aluminum or aluminum alloy material). The density of aluminum is one third the density of copper. According to the electrical performances of aluminum and copper, i.e. the differences of electrical resistivity of solid conductive cores, on the basis that the conductivity performances are the same, the length to diameter ratio of aluminum is merely 1.28 times the length to diameter ratio of copper, while the weight of aluminum material is half the weight of copper material having the same current capacity. Thus, the weight of the lines can be greatly reduced without increasing the installation space of the cables, which is helpful in reducing the weight of the vehicle. By using the aluminum conductive core having lower specific weight and lower cost instead of copper conductive core having higher specific weight and higher cost, the material cost and transportation cost can be reduced, thereby reducing the production cost of the automotive vehicle.

Preferably, the aluminum content of the aluminum conductive core is not less than 95%.

Preferably, the aluminum alloy conductive core may be made of aluminum-copper alloy, aluminum-magnesium alloy, aluminum-lithium alloy, aluminum-manganese alloy, aluminum-zinc alloy, or aluminum-silicon alloy.

The functional requirements of the automotive vehicle can be satisfied by choosing different types of alloy according to the different requirements for electrical properties, mechanical properties, and weight of the cables.

Preferably, the conductive core segments have an ellipse, a polygonal, an E-shaped, an F-shaped, an H-shaped, a K-shaped, a L-shaped, a T-shaped, a U-shaped, a V-shaped, a W-shaped, an X-shaped, a Y-shaped, a Z-shaped, a semi-arc-shaped, an arc-shaped, or a wavy cross section.

Preferably, the polygonal shape is a triangle, a quadrilateral, a pentagon, a hexagon, or an octagon.

It should be noted that, configuring the cross-section of the conductive core segments with ellipse, polygonal, or other non-circular shapes is helpful for wiring according to the body profile of the automotive vehicle and reducing the consumption of wiring. The combination of multiple types of cross sections can provide more choices for the vehicle wiring and arrangement of vehicle parts, thereby reducing the production cost.

Preferably, an inner corner of the cross section of the conductive core segment has a fillet.

It should be noted that, configuring the inner corners of the polygon with fillets in the case of manufacturing a polygonal conductive core segment can prevent the sharp edges and corners of the conductive core segments from piercing through the insulation layer. Thus, the electric discharge caused by burrs under a large current and the breakdown can be prevented, so the insulation layer is protected and the service life of the cable segments can be prolonged.

Preferably, the insulation layer is wrapper over the conductive core segment, and the profile of the insulation layer fits with the conductive core segments.

It should be noted that, the cross-sectional shape of each cable segment depends on the shape of the conductive core segment since the insulation layer is wrapped over the outer wall of the conductive core segments. In this way, the cable can be manufactured in different shapes to fit in with the profile of an automotive vehicle for connection and arrangement in accordance with actual requirements of different parts of the automotive vehicle.

It should be noted that the insulation layer may either be wrapper over the outer wall of the conductive core segments, or be wrapped over the connection joint between the conductive core segments.

It should be noted that, the material of the insulation layer includes but is not limited to one or more items of PVC, silicone rubber, TPE, XPE, PP, XLPE, FEP, ETFE, TPR, and TPFE.

Preferably, the conductive core segments are connected to one or more cables of solid cable, partly solid cable, hollow cable, or flexible cable.

To achieve the second objective mentioned above, the present invention uses the following technical solutions.

A method for manufacturing the above-mentioned irregular-shaped cable includes the following steps:

S1: the metal raw material is extruded through a mold with an extruder to produce the semi-finished conductive core segments, then the semi-finished conductive core segments are cooled to obtain conductive core segments, ultimately;

S2: the conductive core segments are connected with each other; and

S3: well-connected conductive core segments are put into an insulation layer extruder to extrude the insulation layer over the conductive core segments and make the conductive core segments fit with the insulation layer.

Alternatively, the manufacturing method includes the following steps:

i: the metal raw material is extruded through a mold with an extruder to produce the semi-finished conductive core segments, then the semi-finished conductive core segments are cooled to obtain conductive core segments, ultimately;

ii: the conductive core segments are put into the insulation layer extruder to extrude the insulation layer on the conductive core segments and make the conductive core segments fit with the insulation layer; and iii: the conductive core segments wrapped with the insulation layer are connected to each other.

Preferably, the conductive core segments may be connected to each other by welding, crimping, butt fusion, or plug-in connection.

It should be noted that, generally speaking, the methods for manufacturing the irregular-shaped cable both involve the step of first producing the conductive core segments by an extruder. Subsequently, the conductive core segments may be connected to each other before extruding the insulation layer or the insulation layer may be first extruded on each conductive core segment, then the conductive core segments wrapped with the insulation layer are connected to each other. Both of these two manufacturing processes are acceptable.

It should be noted that, in the process of connecting the conductive core segments, the cable segments with or without insulation layer are installed and connected according to the actual profile of the vehicle body to reduce the material consumption of wiring, save space, and greatly reduce the production cost. In the present technical solution, the necessary tools and raw materials include raw material aluminum bars, extruder, and wire spool.

It should be noted that, the temperature of the mold should be maintained over 360° C. in the extrusion process, if aluminum is selected.

It should be noted that, maintaining the temperature of the mold over 360° C. in the use prevents cooling and solidifying of the aluminum when going through the mold in the extrusion under the temperature of 360° C. due to the contact with the mold at a low temperature, thereby ensuring the success of the aluminum extrusion process. The heating duration can be set as 20-60 minutes according to the size of the mold, so as to ensure that the aluminum bar is heated to an optimal state for processing and prevent an insufficient temperature inside the mold caused by a short heating duration for a large mold.

It should be noted that, preheating the mold by a heating furnace before the extrusion and formation can reduce the time for production preparation and increase the manufacturing efficiency.

It should be noted that, straightening and brush cleaning the metal raw material bar before the extrusion can make the extrusion process more smooth, and thus improve the product quality. Specifically, the metal raw material bar is straightened by a straightener, and the surface of the metal raw material bar is treated by an online brush cleaning machine to remove impurities and the oxide layer.

It should be noted that, the semi-finished conductive core segments are extruded and formed once and for all without the need of other auxiliary equipment for annealing, heating, acid pickling, and side cut, so the unpolluted production with short processes can be realized.

Preferably, the extrusion is a continuous extrusion, and the extruder is preferably selected as a continuous extruder.

It should be noted that, when the continuous extrusion process is used, the metal raw material bar is put into the continuous extruder, then the continuous extruder is started to melt and extrude the aluminum bar from the mold through the heat and pressure generated by the rotary friction of the extrusion wheel inside the continuous extruder. Accordingly, the semi-finished conductive core segments in the same shape of the mold are formed.

Specifically, the metal raw material bars are continuously fed into the rotary extrusion wheel with grooves. The metal raw material bars are subjected to a radial extrusion and friction in the groove. The metal raw material bars get heated to a sufficient temperature and reach a recrystallization state under the extrusion and friction, then are extruded out of the mold through the chamber and formed once and for all. In the whole extrusion process, the compactness of the material increases, the crystalline grains are uniform and compact, thereby decreasing the electrical resistance and improving the conductivity performance.

It should be noted that, an ultra-long conductive core segment can be produced by using a material coil of metal raw material bar as the raw material. By using the traditional processing method, the maximum length won't be more than 30-50 meters, while by using the continuous extrusion method, the length can be up to thousands to tens of thousands of meters, thereby increasing the efficiency of production and decreasing the cost of production.

It should be noted that, the metal raw material bar generates sufficient heat through deformation and thermal deformation of the friction during the extrusion process, so there is no need for additional process such as annealing and heating etc., thereby reducing the unit energy consumption of the product.

It should be noted that, there is no waste material from discard and edge cutting in the continuous extrusion manufacturing, so the utilization rate of material is high and the yield of the semi-finished conductive core segments can reach more than 95%.

The present invention also provides another method for manufacturing the irregular-shaped cable which includes the following steps:

(1) inputting the 3D data of the irregular-shaped cable into the 3D printer to print the conductive core of the irregular-shaped cable by the 3D printer based on the data; and (2) manufacturing the insulation layer.

It should be noted that, the irregular-shaped cable can also be manufactured by using 3D printing technology. Specifically, after inputting the data of the irregular-shaped cable required by the automotive vehicle into the 3D printer, the 3D printer will print the irregular cable according to the data such as shape, hardness, etc. of the irregular-shaped cable.

Specifically, in the method for manufacturing the conductive core segments, the structures of the conductive core segments are decomposed as multiple layers by the computing device of the 3D printer, then material constituents of the conductive core segments are sent to the working region by the print head of the 3D printer to melt the constituent materials. By moving the table, a fused deposition solid can be obtained by addition i.e. the finished conductive core segments.

Specifically, the 3D printing technique may be a laser beam, an electron beam, or an electric arc beam mode.

Alternatively, the manufacturing method includes the following steps:

(2) making a mold based on the 3D data of the irregular-shaped cable, heating the metal raw material until the metal materials are molten, pouring or low-pressure casting the metal liquid into the mold, and forming the conductive core of the irregular-shaped cable after cooling down; and (2) manufacturing the insulation layer.

Specifically, since the product is manufactured by mold casting and formed once and for all, there is no need for the secondary processing, and the shape is uniform. Thus, the consistency of the product can be remarkably improved.

Preferably, in the process of manufacturing the insulation layer, the insulation layer is printed, coated, or extruded on the surface of the conductive core to be fitted therewith.

It should be noted that, in the method of manufacturing the insulating layer, a fused extrusion printing mode is used in the 3D printer, and the material is heated and molten in the spray head. The spray head moves along the cross-sectional profile of a part and the filling path, while the molten material is extruded or sprayed out. The material solidifies quickly and gets bonded to the surrounding material to form the insulation layer.

It should be noted that, in terms of the method for manufacturing the insulation layer, the insulation layer may also be fitted on the surface of the conductive core by coating. Under pressure, the material is sprayed and coated on the surface of the conductive core with a coating machine or a coating gun. The coating machine or the coating gun moves along the exterior profile of the conductor. The material solidifies quickly and becomes bonded to the conductive core to form the insulation layer after being sprayed out.

It should be noted that, in terms of the method for manufacturing the insulation layer, the insulation layer may also be fitted on the surface of the conductive core by extrusion. The material is heated and molten by the screw of the extruder, and extruded out of the mold under the pressure of the extruder, then bonded to the surface of the conductive core segment to form the insulation layer.

Compared with the prior art, the present invention has the following advantages.

1. The cable of the present invention is connected end to end by at least two cables having different cross sectional shapes. By doing so, the cables can be installed according to actual needs of the body profiles of different parts of the vehicle, so as to reduce material consumption and reduce the cost of wiring. In the meantime, the cable of the present invention can avoid the situation of stress on one cable that occurs on the ordinary cables frequently when the vehicle is badly impacted and disperse the stresses on the cable quickly, so as to prevent the cables from being broken by stresses and greatly improve the safety performance of the automotive vehicles.

2. In the present invention, the effective conductive cross sectional area of the conductive core segments of the cable have a tolerance range of ±20%. With this design, the electrical conductivity of the irregular-shaped cable can be ensured to avoid a local overheat of the cable caused by a huge gap of the conductivity, thereby avoiding the safety problems caused by the local overheat.

3. The present invention uses one or more items of PVC, silicon rubber, TPE, XPE, PP, XLPE, FEP, ETFE, TPR, and TPFE to make the insulation layer. The insulation layer is wrapped over the external wall of the conductive core to make the cross sectional shape of the cable segment consistent with that of the conductive core segment. In this way, the usage requirements of the irregular-shaped cable at different temperatures, different humidity, and different chemical environments can be satisfied.

4. In the present invention, a conductive core connector with the shapes of its two ends respectively the same as the cross-sectional shapes of the two conductive core segments to be connected is used to solve the problem that two cable segments having different cross-sectional shapes cannot be directly connected, thereby improving the connection efficiency and reducing the connection cost.

5. In the present invention, by extending the cable in a superimposing, folding and turning manner, the eddy current effect caused by the transmission of high-voltage current can be eliminated to satisfy the requirement of electromagnetic compatibility for the overall vehicle without influencing the operation of other electric devices in the vehicle. Thus, the cable can be well applied in the cases requiring high voltage and large current, such as new energy automobiles, etc.

6. In the present invention, the aluminum conductive core (including aluminum core or aluminum alloy material) is used in the cable to substitute the copper conductive core available now. On one hand, since the aluminum conductive core is lighter, it can achieve a weight reduction of the automotive vehicle. On the other hand, since the aluminum conductive core is also cheaper, the costs of production and transportation can be greatly reduced, and thus the production cost of an automotive vehicle can be reduced.

7. According to the present invention, when conductive core segment of the cable is ellipse, polygonal, E-shaped, F-shaped, H-shaped, K-shaped, L-shaped, T-shaped, U-shaped, V-shaped, W-shaped, X-shaped, Y-shaped, Z-shaped, semiarc-shaped, arc-shaped, or wavy, the cable can better fit the profile of the vehicle, and the wiring process can be simplified. In the meantime, the internal corners of the polygonal conductive core segments are processed with fillets to prevent sharp edges from piercing through the flexible insulation layer and prevent the burr from breaking through the insulation layer, so as to protect the cable segments effectively and prolong its service life. Moreover, the application of the polygonal cables can be improved.

8. The present invention provides a method for manufacturing the cable in which the conductive core segments having different shapes are separately manufactured in segments based on the body profiles of an automotive vehicle. Then, the conductive core segments are connected to each other to form the conductive core, and the flexible insulation layer is wrapped over the obtained conductive core to form the cable. With this method, the material consumption of wiring can be reduced, the space can be saved, and the production cost of the cable can be greatly reduced.

9. The present invention provides a method for manufacturing the cable, in which a continuous extrusion process is used in the extrusion to ensure that the product extruded at a high temperature has the best forming precision and good cross-sectional shape. During the whole extrusion process, the compactness of the material increases and the crystalline grains become uniform, thereby reducing the resistivity, improving conductivity, and reducing the unit energy consumption of the product.

10. The present invention provides a method for manufacturing the cable, in which the 3D printing is used to manufacture the conductive core segments and coat the insulation layer. By doing so, a wide processing range and a high utilization rate of raw materials can be obtained without the need to invest in a number of molds and equipment. The method can quickly manufacture the corresponding products in trial-producing or producing multiple types of irregular-shaped cables in a small quantity. Thus, the method can reduce cost, increase efficiency, and meet the diverse requirements in the field of automotive vehicles.

11. The present invention provides a method for manufacturing the cable, in which the cable segments are manufactured by pouring. The cable segments are formed once and for all without the need for secondary processing and have a uniform shape, thus consistency of the product is greatly increased.

The above description is just an overview of the technical solutions of the present invention. In order to clearly understand the technical solutions of the present invention to be able to implement the invention according to the content of specification, and in order to make the above and other objectives, features, and advantages of the present invention more concise and understandable, preferred embodiments are described hereinafter with reference to the drawings. The details are as below.

In the drawings, 1. cable; 11. first conductive core segment; 12. second conductive core segment; 13. third conductive core segment; and 2. connector.

DETAILED DESCRIPTION OF THE EMBODIMENTS

To further describe the technical solutions used to achieve the intended invention objectives and the effects thereof, the embodiments, structure, features, and effects of the present invention will be described in detail hereinafter with reference to the drawings and preferred embodiments.

An irregular-shaped cable is provided. The conductive core of the irregular-shaped cable includes at least two conductive core segments having different cross-sectional shapes, and the at least two conductive core segments are connected end to end.

Embodiment 1

Figure 1:
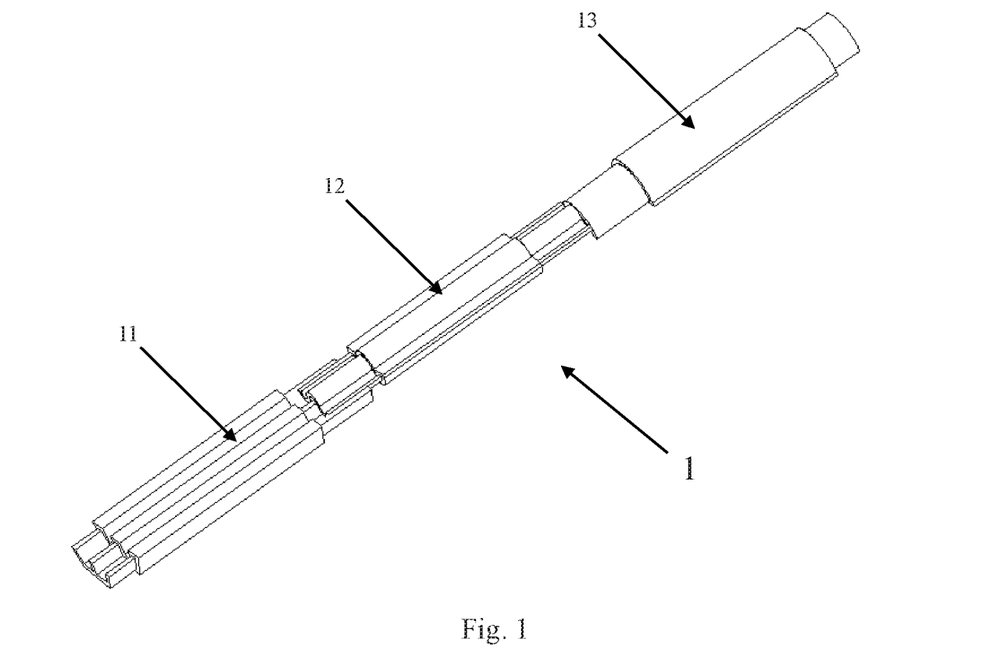
FIG. 1 is a structural diagram of a first preferred embodiment of an irregular-shaped cable of the present invention.
Figure 2:
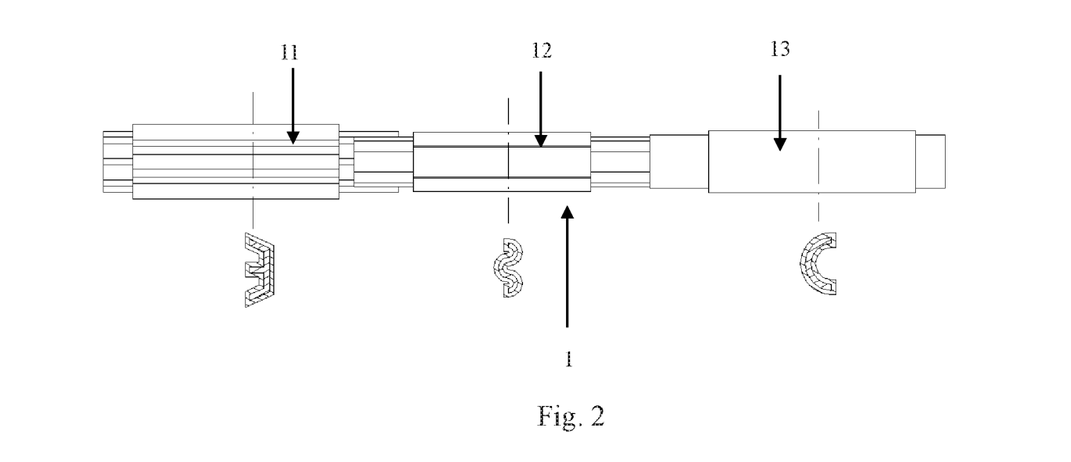
FIG. 2 is a bottom view of the structural diagram of the embodiment shown in FIG. 1.

FIG. 1 and FIG. 2 show the first embodiment of the present technical solution. In the present embodiment, the conductive core of cable 1 includes three conductive core segments (including first conductive core segment 11, second conductive core segment 12, and third conductive core segment 13) having different cross-sectional shapes, and the three conductive core segments are connected end to end.

In the present embodiment, the cross section of the first conductive core segment is W-shaped, the cross section of the second conductive core segment is wavy in shape, and the cross section of the third conductive core segment is arc-shaped. The upper surface of the rear end of the first conductive core segment is connected to the lower surface of the front end of the second conductive core segment. The rear end of the second conductive core segment is connected to the front end of the third conductive core segment. The insulation layer of PVC material is wrapped over the conductive core segments from the outside.

In the present embodiment, the cross sections of conductive core segments are W-shaped, wavy, and arc-shaped, respectively. In other embodiments, the cross section of the conductive core segment may also be ellipse, polygonal, E-shaped, F-shaped, H-shaped, K-shaped, L-shaped, T-shaped, U-shaped, V-shaped, X-shaped, Y-shaped, Z-shaped, or semiarc-shaped. The specific cross sectional shape may be set according to actual needs.

In the present embodiment, the effective cross-sectional area for the electric conduction inside each conductive core segment may have a certain tolerance due to the manufacture errors or adaption to different vehicles in practice. The inventor believes that the tolerance should be within ±20% to ensure the electrical safety. By setting the tolerance range as ±20%, the conductivity of the irregular-shaped cable can be ensured to avoid local overheat of the cable caused by huge performance gap of conductivity of the cable, so as to avoid safety issues that may occur due to the local overheat. In terms of common vehicle and parts thereof, the effective cross-sectional area of the conductive core segment of the cable generally varies from 0.1 $mm^2$ to 180 $mm^2$ to be adaptable to different application contexts. Specifically, for example, in one embodiment, the conductive core segments described in the present solution are applied as door cables of a vehicle, if the cross-sectional area of the conductive core segment is 0.12 $mm^2$, since the tolerance range of the effective cross-sectional area for the electric conduction of the conductive core segment is ±20%, the effective cross-sectional area for electric conduction of the conductive core segment may vary from 0.096 $mm^2$ to 0.144 $mm^2$. For another example, in one embodiment, the conductive core segments described in the present solution are used as starter cables, if the cross-sectional area of the conductive core segment is 49 $mm^2$, since the tolerance range of the effective cross-sectional area for the electric conduction of the conductive core segment is ±20%, the effective cross-sectional area for electric conduction of the conductive core segment of the present solution may vary from 39.2 $mm^2$ to 58.8 $mm^2$. For yet another example, in one embodiment, the conductive core segments described in the present solution are used as power source lines of the vehicle, if the cross-sectional area of the conductive core segment is 59 $mm^2$, since the tolerance range of the effective cross-sectional area for the electric conduction of the conductive core segment is ±20%, the effective cross-sectional area for electric conduction of the conductive core segment may vary from 47.2 $mm^2$ to 70.8 $mm^2$. For yet another example, in one embodiment, the conductive core segments of the present solution are used as power source lines for the new energy vehicle, if the cross-sectional area of the conductive core segment is 180 $mm^2$, since the tolerance range of the effective cross-sectional area for the electric conduction of the conductive core segment is ±20%, the effective cross-sectional area for electric conduction of the conductive core segment may vary from 144 mm² to 216 mm².

In the present embodiment, the first conductive core segment, the second conductive core segment, and the third conductive core segment all have a solid structure. In other embodiments, the conductive core segment may be configured as partly solid or totally hollow according to the actual situations, so as to install the cables in better fit with the actual profile of an automotive vehicle. Additionally, the conductive core segment may be flexible, which can reduce the tendency of cable damage caused by a crash of the automotive vehicle and improve safety performance.

In the present embodiment, the cable is installed in varying curved shapes according to the automotive vehicle bottom (the surface of the automotive vehicle bottom varies as W-shape, wavy-shape, and arc-shape sequentially from the left to the right) to realize the wiring of the part of vehicle body in a close fit manner, reduce the material consumption of the wiring, and reduce the assembling space.

In the present embodiment, the insulation layer of the cable is made of PVC. Besides the insulativity, PVC also has a waterproofness, a certain extent of resilience, abrasive resistance, and hardness, which ensures that the flexible insulation layer would not be damaged during the manufacturing and forming process of the cable. In other embodiments, the material of the insulation layer of the cable may also be one or more items of silicon rubber, TPE, XPE, PP, XLPE, FEP, ETFE, TPR, and TPFE.

In the present embodiment, the inner corners of the cross section of the conductive core segment are fillets. Since the cable segments are in polygonal structure rather than circular structure, in order to protect the insulation layer, by rounding the inner corners of the three conductive core segments, i.e. the inner corners of the conductive core are fillets, the sharp edges can be prevented from piercing through the flexible insulation layer, and the breakdown caused by the electric discharge of the burr due to overcurrent can be avoided, thereby effectively protecting the cable and prolonging the service life of the cable.

In the present embodiment, the cable core segment is aluminum core. The cable core segment made of aluminum can reduce the weight of the cable, which facilitates the weight reduction of the vehicle body. In other embodiments, the cable core segment may also be aluminum alloy core, and the aluminum alloy core may be aluminum-copper alloy, aluminum-magnesium alloy, aluminum-lithium alloy, aluminum-manganese alloy, aluminum-zinc alloy, or aluminum-silicon alloy, etc.

Embodiment 2

Figure 3:
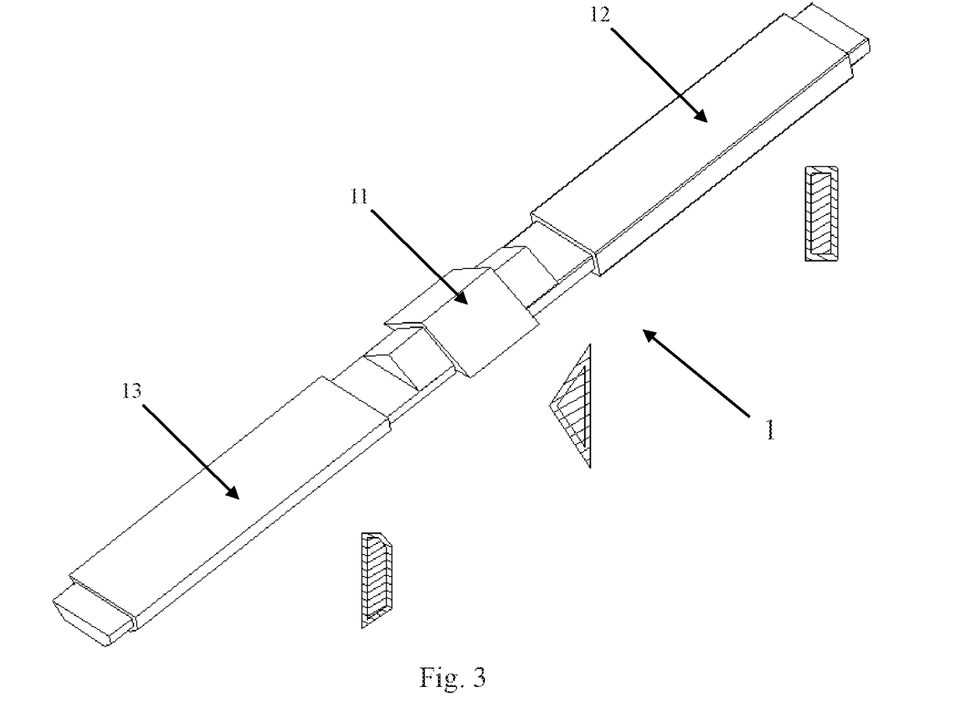
FIG. 3 is a structural diagram of a second preferred embodiment of an irregular-shaped cable of the present invention.

FIG. 3 shows the second embodiment of the present technical solution. The only difference between the present embodiment and embodiment 1 is that in the present embodiment, cable 1 includes three polygonal conductive core segments having different shapes. Specifically, the cross section of first conductive core segment 11 is triangle-shaped, the cross section of second conductive core segment 12 is quadrangle-shaped, and the cross section of third conductive core segment 13 is pentagon-shaped. The lower part of the rear end of the first conductive core segment is connected to the upper part of the front end of the second conductive core segment, and the lower part of the front end of the first conductive core segment is connected to the upper part of the rear end of the third conductive core segment. Other implementations of the present embodiment are the same as that of embodiment 1, thus they will not be described in detail herein.

In the present embodiment, the cross section of the conductive core segments may be configured as various polygonal shapes such as triangle, quadrangle, pentagon, and so on according to the actual requirements of the vehicle body. In other embodiments, the cross section of the conductive core segment may also be configured as other polygonal shapes according to actual requirements, such as hexagon, octagon, etc.

Embodiment 3

Figure 4:
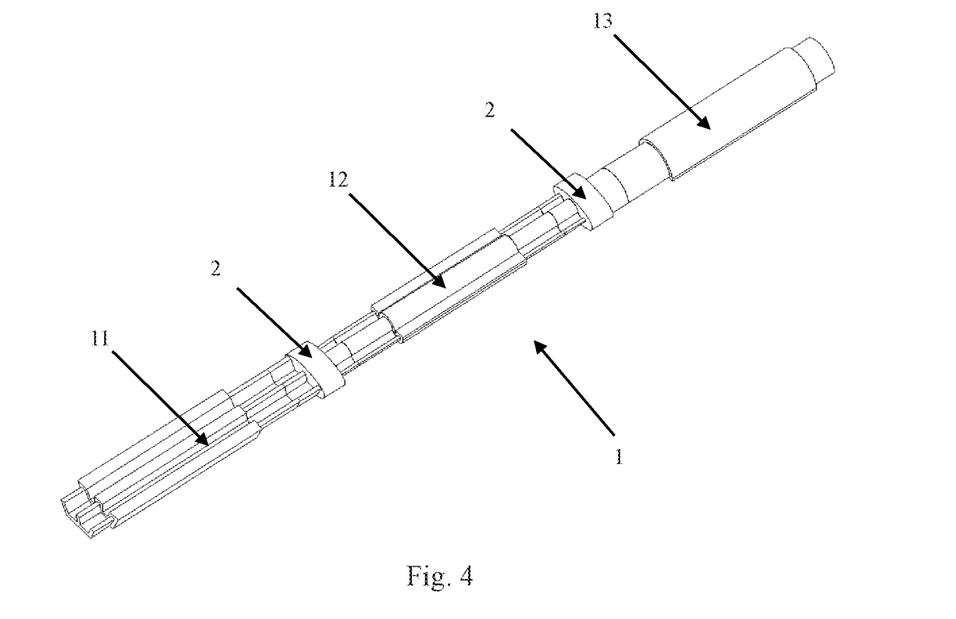
FIG. 4 is a structural diagram of a third preferred embodiment of an irregular-shaped cable of the present invention.

FIG. 4 shows the third embodiment of the present technical solution. The only difference between the present embodiment and embodiment 1 is that in the present embodiment, the conductive core of cable 1 is not formed by three conductive core segments having different shapes which are connected to each other. The three conductive core segments are connected to each other by conductive core connector 2. Namely, when the cross sections of two adjacent conductive core segments have different shapes, the two conductive core segments are connected through a conductive core connector with the shapes of its two ends the same as the cross-sectional shapes of the two conductive core segments, respectively. Specifically, the rear end of first conductive core segment 11 is connected to the front end of second conductive core segment 12 through the conductive core connector, and the rear end of second conductive core segment 12 is connected to the front end of third conductive core segment 13 through the conductive core connector.

To ensure the consistency of conduction effects, in the present embodiment, the values of the cross-sectional areas of the conductive core connector are close to each other. Preferably, the values of the cross-sectional areas of the connector are equal at every cross section, and in this case, the consistency of conduction effects of the conductive core connector is the best. Other implementations of the present embodiment are the same as that of embodiment 1, thus they will not be described in detail herein.

Embodiment 4

Figure 5:
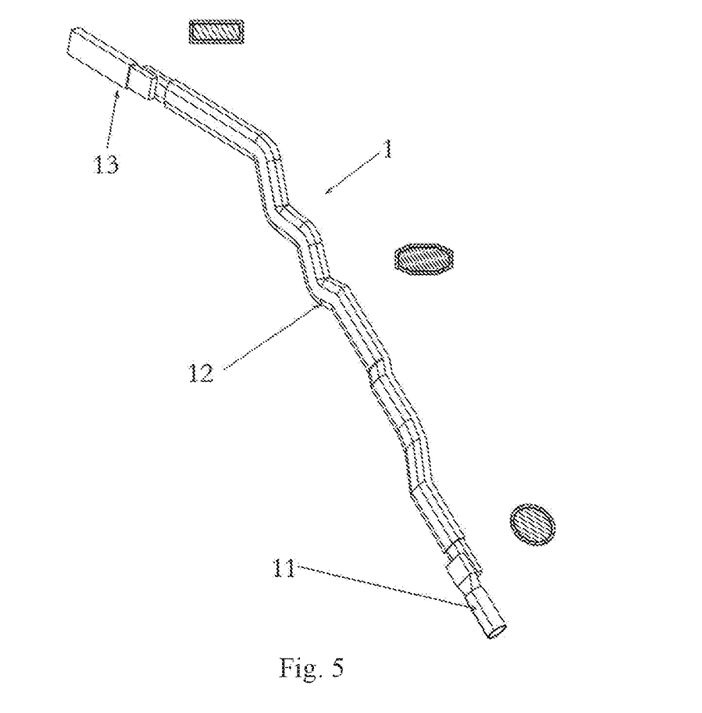
FIG. 5 is a structural diagram of a fourth preferred embodiment of an irregular-shaped cable of the present invention.

FIG. 5 shows the fourth embodiment of the present technical solution. In the present embodiment, the conductive core of cable 1 is not connected by two or three conductive core segments having the same shape or material, but connected by three conductive core segments having different shapes or materials. Specifically, first conductive core segment 11 is flexible oval stranded conductive core segment, second conductive core segment 12 is a solid conductive core segment having an octagonal cross section, and third conductive core segment 13 is a flexible stranded conductive core segment having a quadrangle cross section. The lower part of the rear end of the first conductive core segment is connected to the upper part of the front end of the second conductive core segment by welding. The upper part of the rear end of the second conductive core segment is connected to the lower part of the front end of the third conductive core segment by welding. As a preferred embodiment, the welding is ultrasonic welding. In terms of the connection between the flexible stranded conductive core segment and the solid conductive core segment having the octagonal cross section, the upper end surface and the lower end surface may be reversed.

In one embodiment, the shape of the solid conductive core segment having the octagonal cross section can be obtained by bending after the extrusion. In other embodiments, the shape and structure of the solid cable segment are obtained by pouring the molten aluminum liquid into the mold. Alternatively, the shape and structure of the solid conductive core segment are directly obtained by a 3D printer.

Other implementations of the present embodiment are the same as that of embodiment 1, thus they will not be described in detail herein.

Embodiment 5

Embodiment 5 is the fifth embodiment of the present technical solution. The present embodiment is an improvement of embodiment 4 described above. In this embodiment, a flexible stranded cable is connected to a formed irregular-shaped cable at any part.

In the present embodiment, the irregular-shaped cable is solid. Certainly, as mentioned in the above embodiment, the irregular-shaped cable may also have hollow or other shapes.

In the present embodiment, the irregular-shaped cable is formed by bending. Certainly, as mentioned in the above embodiment, the shape of the irregular-shaped cable may be selected according to actual requirements.

The implementations of the specific irregular-shaped cable are the same as that of the above-mentioned embodiments, thus they will not be described in detail herein.

Embodiment 6

Figure 6:
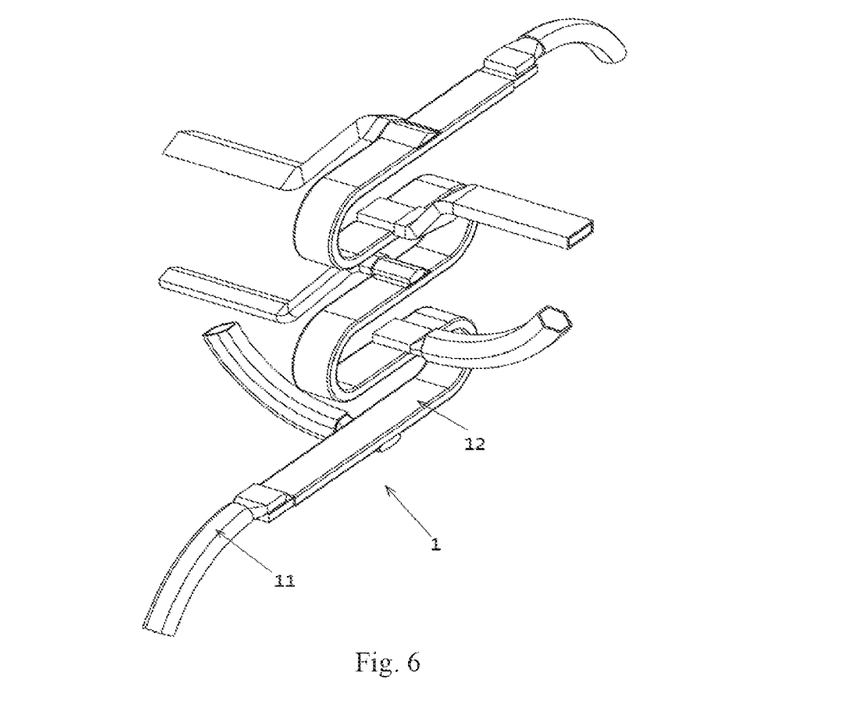
FIG. 6 is a structural diagram of a sixth preferred embodiment of an irregular-shaped cable of the present invention.

FIG. 6 shows the sixth embodiment of the present technical solution. The difference between the present embodiment and the above-mentioned embodiments is that in the present embodiment, second conductive core segment 12 of cable 1 is respectively connected to a solid cable with a triangular cross section, a solid cable with a quadrangle cross section, a partly solid cable with a pentagonal cross section, a flexible cable with a hexagonal cross section, and a flexible cable with an octagonal cross section. In other embodiments, the cables connected to the second conductive core segment may be solid, partly solid, hollow, or flexible. The cross section of the cables connected to the second conductive core segment may be one or any combination of ellipse-shaped, E-shaped, F-shaped, H-shaped, K-shaped, L-shaped, T-shaped, U-shaped, V-shaped, W-shaped, X-shaped, Y-shaped, Z-shaped, semiarc-shaped, arc-shaped, or wave-shaped cable structures.

In the present embodiment, the solid cable and flexible cable having different shapes are connected to the second conductive core segment. In other embodiments, the second conductive core segment may also be connected to first conductive core segment 11 or other conductive core segment.

In the present embodiment, the second conductive core segment has a solid structure which can be obtained by bending and folding. When the cable harness has a number of branches, the wiring space and cable materials can be greatly reduced.

Other implementations of the present embodiment are the same as that of the above-mentioned embodiments, thus they will not be described in detail herein.

Embodiment 7

Figure 7:
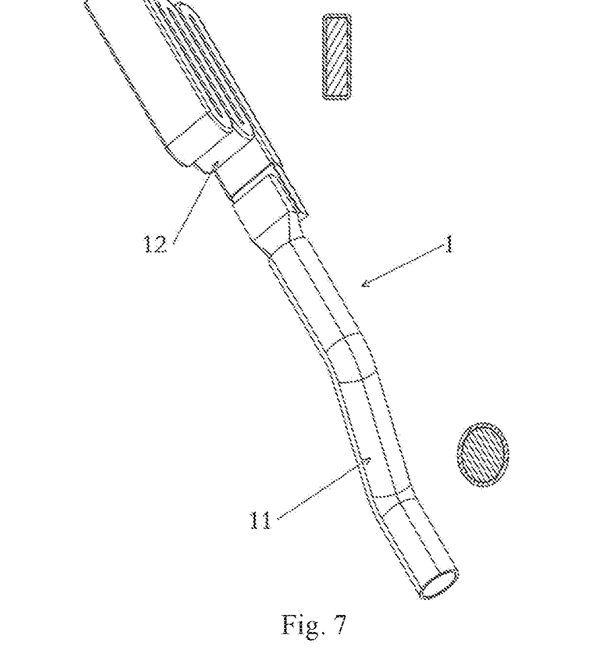
FIG. 7 is a structural diagram of a seventh preferred embodiment of an irregular-shaped cable of the present invention.

FIG. 7 shows the seventh embodiment of the present technical solution. The difference between the present embodiment and the above-mentioned embodiment is that in the present embodiment, first conductive core segment 11 of cable 1 is installed along the body profile of the vehicle, while second conductive core segment 12 extends along the body profile of the vehicle in a folding and turning manner.

In the present embodiment, the shape of the conductive core segment is obtained by bending, stacking, and pressing. The advantage of doing so is that by stacking the cable, the eddy current effect caused by the transmission of high voltage current can be eliminated without influencing the operation of other electrical devices inside the vehicle when the high voltage current is transmitted in the conductive core segment. Other implementations of the present embodiment are the same as that of the above-mentioned embodiments, thus they will not be described in detail herein.

The First Method for Manufacturing the Irregular-Shaped Cable

Figure 8:
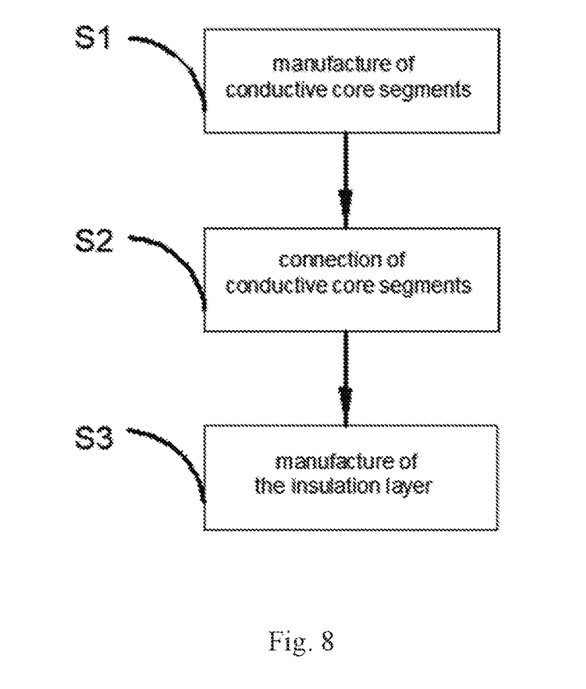
FIG. 8 is a process flow diagram showing the steps of one preferred method for manufacturing an irregular-shaped cable of the present invention.

FIG. 8 shows the first method for manufacturing the above-mentioned irregular-shaped cable of the present invention. For example, the cable of embodiment 2 is manufactured by the method of the present embodiment. In this case, a cable with its conductive core formed by connecting a conductive core segment having a triangle cross section, a conductive core segment having a quadrangle cross section, and a conductive core segment having a pentagonal cross section is manufactured. The metal material used is aluminum. The steps of the method for manufacturing the conductive core segments of the irregular-shaped cable include the manufacture of the conductive core segments, the connection of the conductive core segments, and the manufacture of the insulation layer.

S1: the manufacture of the conductive core segments.

The aluminum bar is extruded and formed through an extruder with molds. Then, the extruded semi-finished aluminum conductive core segment is cooled down to obtain the aluminum conductive core segment ultimately. The specific manufacturing steps are as follows.

The first step is to prepare the material and equipment required in manufacturing the aluminum conductive core, i.e. raw material aluminum bar, mold, continuous extruder, and wire coil. Specifically, the required mold includes a triangular cable mold, a quadrangular cable mold, and a pentagonal cable mold. Before the use, the molds should be checked for assembly problems to make sure that the manufacturing requirements for smoothness and degree of alignment are satisfied. Otherwise, the molds should be polished and repaired.

The second step is to install the triangular cable mold in a cavity and fix the triangular cable mold to the continuous extruder.

The third step is to straighten the aluminum bars and clean its surfaces.

The fourth step is to perform the extrusion and forming step after the above-mentioned steps are all done. The coiled aluminum bars are put into the groove of an extruding wheel of the continuous extruder after passing through a pay-off rack, a straightener, and a cleaning machine. Then, the continuous extruder is started. Under the friction and pressure of the extruder, the aluminum bar is heated, molten, and extruded out from the triangular cable mold to form a semi-finished aluminum conductive core segment having the same shape as the triangular cable mold.

After that, the above step is repeated to install the quadrangular cable mold and pentagonal cable mold in the cavity of a continuous extruder, and then the continuous extruder is started to extrude the aluminum bars out of the mold after the aluminum bars are heated and molten, so as to form a semi-finished quadrangular aluminum conductive core segment and a semi-finished pentagonal aluminum conductive core segment, respectively.

As a preferred embodiment, the mold is preheated by a heating furnace before the extrusion and formation to reduce the preparation time of production and increase the manufacturing efficiency.

As a preferred embodiment, the temperature of the mold is kept over 360° C. in the extrusion and formation process to make sure that the aluminum at that temperature will not be cooled and solidified due to the contact with the mold at low temperature when going through the mold in the extrusion process, so as to ensure the success of the aluminum extrusion process.

The fifth step is to put the three semi-finished aluminum conductive core segments obtained in the above-mentioned steps in a cooling system respectively for cooling down, and a blow-dry device is started to blow and dry the surface.

S2: the connection of the conductive core segments.

The connection of the aluminum conductive core segments obtained in the above-mentioned steps includes the following steps.

The three aluminum conductive core segments obtained in the above-mentioned steps are connected according to the body profile of an automotive vehicle. Specifically, the lower part of the rear end of the triangular cable segment is connected to the upper part of the front end of the quadrangular cable segment. The lower part of the rear end of the quadrangular cable segment is connected to the upper part of the front end of the pentagonal cable segment.

The specific method used for connection is welding. In other embodiments, the aluminum conductive core segments may be connected by crimping, butt fusion, or plug-in connection, etc.

S3: The manufacture of the insulation layer.

The semi-finished aluminum conductive core segments obtained in the above steps enter an insulation layer extruder after passing through a pay-off rack and a straightener to extrude the insulation layer on the semi-finished aluminum conductive core segment, thereby forming a finished irregular-shaped cable. The material of the insulation layer may be one or more items selected from PVC, silicon rubber, TPE, XPE, PP, XLPE, FEP, ETFE, TPR, and TPFE according to actual requirements.

As a preferred embodiment, the conductive core segment may be obtained by 3D printing based on the actual parameters of the cable to be manufactured input into a 3D printer.

As a preferred embodiment, a mold may be made according to the 3D data of the conductive core segment, aluminum is heat until molten and poured into the mold. After cooling, the shape of the irregular-cable is formed.

The Second Method for Manufacturing the Irregular-Shaped Cable

The present invention further provides the second method for manufacturing the above irregular-shaped cable. The difference between the manufacturing method of the present embodiment and the first one is that after the completion of S1, i.e. the aluminum bars are extruded and formed by the aluminum extruder with the mold, the extruded semi-finished aluminum conductive core segments are cooled down to obtain the aluminum conductive core segments, the insulation layer is first made for every aluminum conductive core segment, then the aluminum conductive core segments having the insulation layer are peeled off and connected to obtain the finished irregular-shaped cable. The manufacture and connection process of the insulation layer are similar to the first manufacturing method, thus they will not be described in detail herein.

The Third Method for Manufacturing the Irregular-Shaped Cable

The present invention also provides the third method for manufacturing the above irregular-shaped cable. According to the manufacturing method of the present embodiment, the irregular-shaped cable of the embodiment 2 is taken as an example for illustration. The method includes the following steps.

(1) prior 3D model data of the irregular-shaped cable, i.e. a cable having a triangle cross section, a quadrangle cross section, and a pentagonal cross section, is created, and the 3D model data is input into the 3D printer to print the conductive core of the special-shaped cable by 3D printing.

Alternatively, the 3D data of the conductive core segment is used to manufacture the mold, the raw material of aluminum or aluminum alloy is heated until molten, then the aluminum liquid is poured or cast in the mold under low pressure and cooled down to form the conductive core segment of the irregular-shaped cable.

(2) In the manufacture of the insulation layer, the steps for manufacturing the insulation layer includes printing, coating, or extruding the insulation layer on the surface of the conductive core to be fitted therewith.

(3) After removal the insulation skin of the connection end of the conductive core segment with insulation layer, the conductive core segments are connected to each other by welding, crimping, butt fusion, or plug-in connection to form the finished irregular-shaped cable.

Alternatively, the conductive core segments may be manufactured by 3D printing or mold casting, separately. Then, the conductive core segments are connected to each other by welding, crimping, butt fusion, or plug-in connection. At last, print, the insulation layer is printed, coated, or extruded on the surface of the connected conductive core segments to be fitted therewith to obtain the finished irregular-shaped cable.

What is claimed is:

1. An irregular-shaped cable having a conductive core, wherein the conductive core comprises at least two conductive core segments having different cross-sectional shapes, and the at least two conductive core segments are connected end to end, wherein the cable fits with the actual profile of an automotive vehicle, and an effective cross-sectional area for an electric conduction inside each conductive core segment has a tolerance range of ±20%.

2. The irregular-shaped cable of claim 1, wherein an end of one conductive core segment is connected to an end of an adjacent conductive core segment.

3. The irregular-shaped cable of claim 1, wherein an upper surface of an end of one conductive core segment is connected to a lower surface of an end of an adjacent conductive core segment.

4. The irregular-shaped cable of claim 1, wherein two adjacent conductive core segments have different cross-sectional shapes, a conductive core connector is used to connect the two adjacent conductive core segments, shapes of two ends of the conductive core connector are the same as the cross sectional shapes of the two adjacent conductive core segments.

5. The irregular-shaped cable of claim 1, wherein there are a plurality of the irregular-shaped cables connected according to a body profile of a vehicle.

6. The irregular-shaped cable of claim 1, wherein the irregular-shaped cable extends in a superimposing, folding and turning manner along a body profile of a vehicle.

7. The irregular-shaped cable of claim 1, wherein the conductive cores are made of an aluminum alloy or a pure aluminum with an aluminum content not less than 95%.

8. The irregular-shaped cable of claim 7, wherein the aluminum alloy is an aluminum-copper alloy, an aluminum-magnesium alloy, an aluminum-lithium alloy, an aluminum-manganese alloy, an aluminum-zinc alloy, or an aluminum-silicon alloy.

9. The irregular-shaped cable of claim 1, wherein a cross section of at least one of the conductive core segments is elliptical, polygonal, E-shaped, F-shaped, H-shaped, K-shaped, L-shaped, T-shaped, U-shaped, V-shaped, W-shaped, X-shaped, Y-shaped, Z-shaped, semiarch-shaped, arc-shaped, or wavy.

10. The irregular-shaped cable of claim 9, wherein the cross section of at least one of the conductive core segments has a polygonal shape, and the polygonal shape is a triangle, a quadrangle, a pentagon, a hexagon, or an octagon.

11. The irregular-shaped cable of claim 9, wherein an inner corner of the polygonal shape cross section has a fillet.

12. The irregular-shaped cable of claim 1, wherein an insulation layer is wrapper over the conductive core segments, and a profile of the insulation layer fits with the conductive core segments.

13. The irregular-shaped cable of claim 1, wherein the conductive core segments are connected to one or more cables selected from the group consisting of a solid cable, a partly solid cable, a hollow cable, and a flexible cable.

14. The irregular-shaped cable of claim 1, wherein the tolerance range for the effective cross-sectional area for electric conduction inside each conductive core segment controls a conductivity gap of the irregular-shaped cable and/or controls the temperature of the irregular-shaped cable.

15. A method for manufacturing an irregular-shaped cable, wherein a conductive core comprises at least two conductive core segments having different cross-sectional shapes, and the at least two conductive core segments are connected end to end, wherein the cable fits with the actual profile of an automotive vehicle, and an effective cross-sectional area for an electric conduction inside each conductive core segment has a tolerance range of ±20%, and the manufacturing method comprises the following steps:

extruding a metal raw material through a mold with an extruder to produce semi-finished conductive core segments, then cooling the semi-finished conductive core segments to obtain the conductive core segments;

connecting the conductive core segments with each other; and putting the connected conductive core segments into an insulation layer extruder to extrude an insulation layer over the conductive core segments and make the conductive core segments fit with the insulation layer;

or, the manufacturing method comprises the following steps:

extruding a metal raw material through a mold with an extruder to produce semi-finished conductive core segments, then cooling the semi-finished conductive core segments to obtain the conductive core segments;

putting the conductive core segments into an insulation layer extruder to extrude an insulation layer on the conductive core segments and make the conductive core segments fit with the insulation layer; and connecting the conductive core segments wrapped with the insulation layer to each other.

16. The method of claim 15, wherein the conductive core segments are connected to each other by welding, crimping, butt fusion, or plug-in connection.

17. The method of claim 15, wherein a mode for extruding and forming is a continuous extrusion.

18. A method for manufacturing an irregular-shaped cable, wherein a conductive core comprises at least two conductive core segments having different cross-sectional shapes, and the at least two conductive core segments are connected end to end, wherein the cable fits with the actual profile of an automotive vehicle, and an effective cross-sectional area for an electric conduction inside each conductive core segment has a tolerance range of ±20%, and the manufacturing method comprises the following steps:

inputting 3D data of the irregular-shaped cable into a 3D printer to print the conductive core of the irregular-shaped cable by the 3D printer based on the 3D data; and manufacturing an insulation layer;

or, the manufacturing method comprises the following steps:

making a mold based on the 3D data of the irregular-shaped cable, heating a metal raw material until the metal material is molten, pouring or low-pressure casting a metal liquid into the mold, and forming the conductive core of the irregular-shaped cable after cooling down; and manufacturing an insulation layer.

19. The method of claim 18, wherein in a process of manufacturing the insulation layer, the insulation layer is printed, coated, or extruded on a surface of the conductive core to be fitted with the conductive core.

* * * * *